United States Patent Office 3,531,430
Patented Sept. 29, 1970

1

3,531,430

EPDM POLYMER COMPOSITION HAVING IMPROVED BUILDING TACK AND PLASTICITY

Edwin Robert Evans, 2406 London Drive, Chalfonte, Wilmington, Del. 19803

No Drawing. Filed May 4, 1967, Ser. No. 636,008
Int. Cl. C08f *15/40*
U.S. Cl. 260—31.2 9 Claims

ABSTRACT OF THE DISCLOSURE

An EPDM polymer is plasticized and tackified by mixing with a compound of the formula Ar—X where Ar is a cyclic group having one or more hydrocarbon substituents, which substituents contain a total of at least ten carbon atoms and X is a hydrophilic group such as hydroxyl.

BACKGROUND OF THE INVENTION

Synthetic rubber-like polymers are notably deficient in building tack, which is the surface property of natural rubber which enables two pieces of unvulcanized stock to adhere when brought into contact under moderate pressure. Surprisingly enough this characteristic is peculiar to two pieces of natural rubber and neither will adhere to other substances in a like manner; for example, such adhesion does not exist between natural rubber and metal, glass or wood. Unfortunately synthetic rubber-like polymers do not exhibit good building tack and the various means heretofore devised to overcome this deficiency including the addition of natural rubber, synthetic resins or natural products such as rosins or gums during the compounding operation are not satisfactory for EPDM stocks. Moreover, these natural products usually alter the physical properties of the synthetic polymer vulcanizates, and are not even entirely satisfactory for synthetics other than EPDM. Prior attempts to improve building tack of EPDM rubbers have concentrated upon use of one or more adhesive layers to hold EPDM polymer layers together in a sandwich-like structure. There has been a need for a means for improving the building tack of EPDM rubber-like polymers which would provide improved durability to composite articles made therefrom without any need to resort to stratified structures or the additional step, inherent in making such structures, of painting adhesive on the layers to be adhered.

THE INVENTION

In accordance with this invention an EPDM elastomeric composition is provided having excellent building tack and also improved elasticity. This composition comprises essentially an EPDM elastomer in admixture with at least about 10% by weight of a tackifying compound of the formula Ar—X where Ar is a cyclic group having one or more hydrocarbon substituents, which substituents contain a total of at least ten carbon atoms, and X is a hydrophilic group such as hydroxyl.

In the above structural formula "Ar" is a substituted cyclic group, preferably substituted phenyl, but it can also be a substituted naphthyl. Substituents on the ring are saturated aliphatic groups, preferably alkyl groups, of which there can be one or more, preferably two, and the total number of carbon atoms in the substituent groups must amount to at least ten. These groups can contain a total of more than fifty carbon atoms but preferably contain a total of seventeen to forty carbon atoms, such compounds being more readily available than those of higher molecular weight and being particularly efficacious in this invention. Substituents other than alkyl groups, such

2 as halogen (e.g., chlorine, bromine) are permissible so long as they do not react with the particular EPDM polymers being utilized or the compounding agents present.

Preferably the tackifier compound Ar—X will be a substituted phenol of the formula

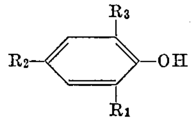

Formula A where $R_1$, $R_2$ and $R_3$ are hydrogen or alkyl groups and the total of the carbon atoms in $R_1$, $R_2$ and $R_3$ is at least ten and preferably 17–40. $R_1$, $R_2$ and $R_3$ can be the same or different.

In addition to the above, corresponding compounds in which X is a different hydrophilic group such as —OR,

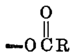

wherein R is alkyl or hydroxy alkyl, preferably a lower alkyl ($C_1$–$C_7$), can also be used herein. Also there may be more than one X group as in the case of alkyldihydroxy benzenes and dialkyldihydroxy benzenes.

Preferred tackifiers for use in this invention are alkyl phenols and dialkyl phenols containing a total of at least ten carbons and particularly 17–40 carbon atoms in the alkyl groups. The specific compounds 2,4-dinonyl phenol and the compound

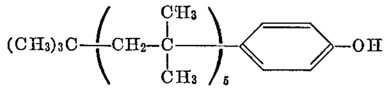

Formula B are exceptionally useful with polymers of ethylene/propylene/1,4-hexadiene containing 50–75% ethylene and 2–5% hexadiene. Poly(isobutyl) phenol-450 which is a commercially available (Rohm & Haas Company) isomer mixture containing the compound of Formula B is a very useful tackifier.

Other representative tackifiers which are useful in this invention include the following:

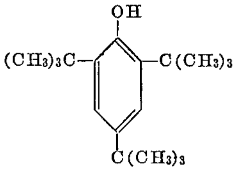

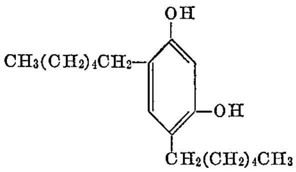

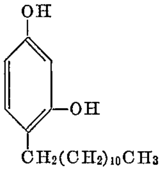

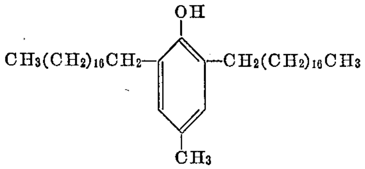

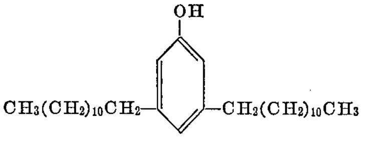

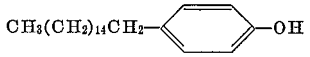

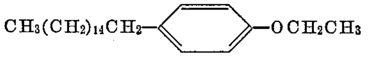

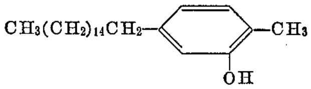

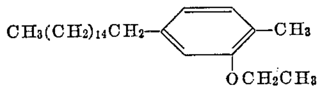
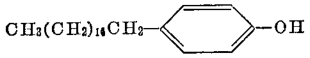
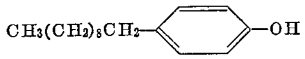
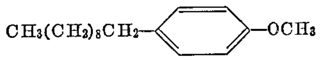
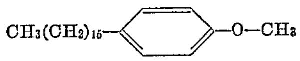
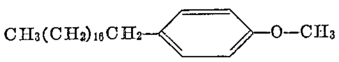
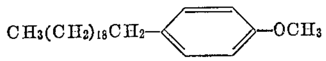
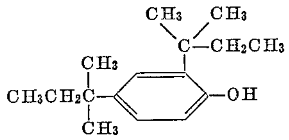
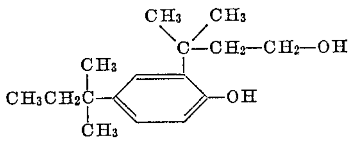
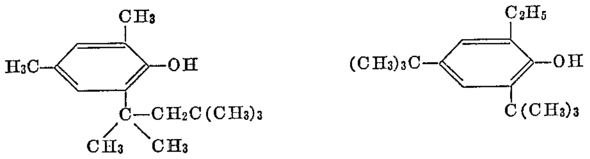
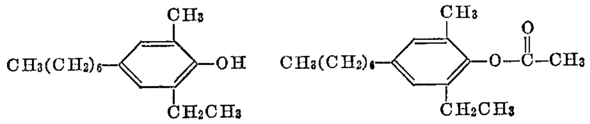
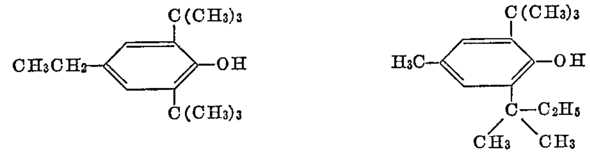
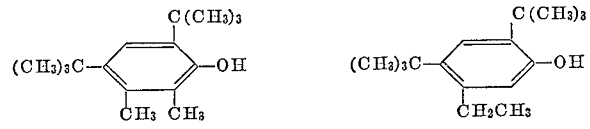
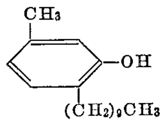
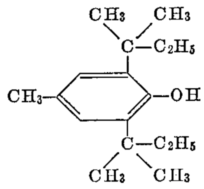
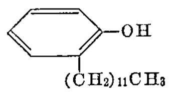
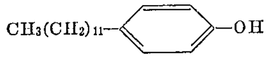
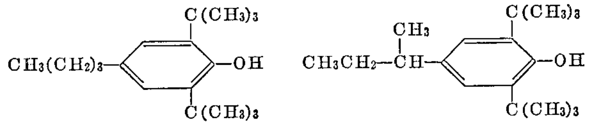
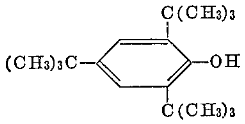
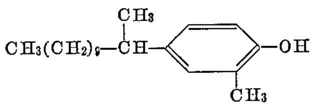
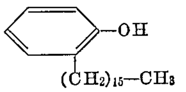
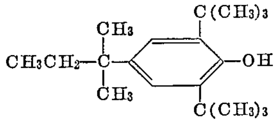
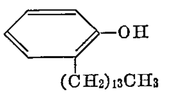
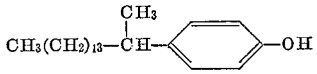
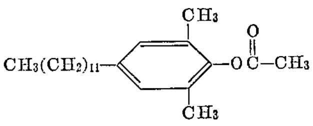
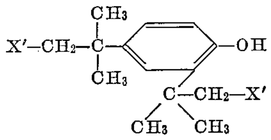
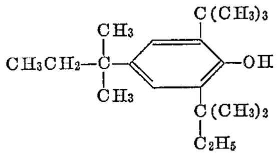
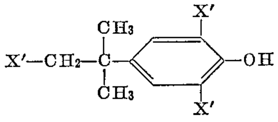
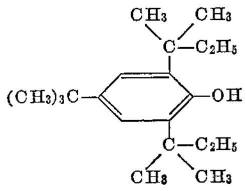
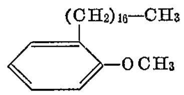
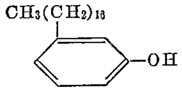
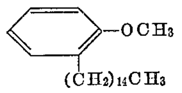
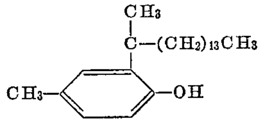
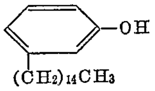
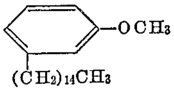
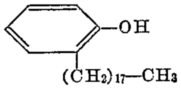
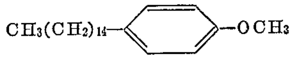
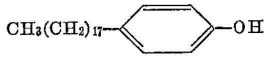
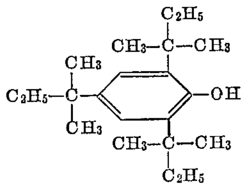
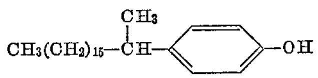

With respect to the above structural formulas the corresponding compounds in which the aromatic ring is a cyclo aliphatic such as a group corresponding to cyclo hexane or an aromatic group corresponding to naphthalene are also useful in this invention. In all of these compounds X' is a t-butyl group.

The tackifiers of this invention are incorporated into the polymers in amounts of at least 10 phr. (parts tackifier per hundred parts polymer by weight) and preferably in an amount of at least 20 phr. There can be as much as 200 phr. or more but usually the amount of tackifier will be 20–150 phr.

All parts, proportions and percentages referred to herein are by weight unless otherwise indicated. The term "comprises essentially" means that the structures or materials referred to are essential but that other structures or materials can be present which do not materially alter the properties of those designated.

The invention is applicable to EPDM polymers generally, that is, to ethylene/propylene/non-conjugated diene polymers having a backbone comprising essentially alkylene groups, the diene being an alpha-olefin. Important polymers in this group include ethylene/propylene/1,4-hexadiene, ethylene/propylene/methylene norbornene, ethylene/propylene/ethylidene norbornene, ethylene/propylene/dicyclopentadiene and ethylene/propylene/methyl tetrahydroindene. Other representative sulfur curable elastomers useful in this invention are those described in U.S. 3,093,620, U.S. 3,162,620 and U.S. 2,933,480.

The composition of the present invention are made by mixing the EPDM polymer and tackifier in any convenient manner which will produce a uniform mixture. This can be accomplished by milling on a conventional rubber mill or in a Banbury mixer. Normally the tackifier will exhibit significant affinity for the polymer and this facilitates the mixing which is usually accomplished in a manner of minutes. Conveniently the tackifier is added to the polymer during the regular compounding operation wherein one or more other additives, curing agents, anti-oxidants, pigments, etc. are added. The latter are not necsary, however, to gain the advantages of this invention. Curing is effected by conventional methods and under the usual conditions.

One of the benefits of this invention, beyond the development of exceptional building tack in polymers which heretofore have resisted exhibiting this property, is the substantially greater plasticity of the polymer/tackifier mixture compared to the polymer alone. Compositions, such as phenolic resins, used heretofore to impart building tack to EPDM polymers have actually reduced plasticity of the polymer and rendered it relatively less workable whereas the present polymer/tackifier compositions are more workable than the polymer alone. Thus, whereas in the past it has been necessary to plasticize EPDM polymers with oils or other agents to improve polymer workability, the present tackifiers are plasticizers as well as tackifiers.

Comparative plasticities are easily determined by Wallace Plasticity measurements. These are made on a Wallace Plastimeter, manufactured by H. W. Wallace & Co., Ltd., London, and, like cold compression set, is a measure of the amount of flow or deformation under load of unvulcanized elastomeric materials. In this measurement the polymer to be tested is sheeted and cut into pellets having a thickness in the range 125 mils to 300 mils. Initially, for a 10-second period, the test pellet is compressed to exactly 1 mm. in thickness and is heated to 100° C. Then the test pellet is subjected to a 10-kg. load for exactly 15 seconds at 100° C. The final thickness of the test piece, expressed in units of 0.01 mm., is the plasticity reading.

The following examples illustrate the invention. All parts, percentages and proportions are by weight unless otherwise indicated.

EXAMPLE 1

Copolymer EPH is an amorphous elastomer made in tetrachloroethylene in the presence of a coordination catalyst formed by combining vanadyl trichloride and diisobutyl aluminum chloride in accordance with the general procedures of U.S. 2,933,480. Copolymer EPH is a 52/44/14 ethylene/propylene/1,4-hexadiene polymer and contains 0.33 carbon-to-carbon double bonds (e.g., $$>C=C<$$

per kilogram. The inherent viscosity (measured at 30° C. on a solution of 0.1 gram of copolymer in 100 ml. of tetrachloroethylene) is about 2.8. The Mooney viscosity (ML 4/250° F.) is about 70.

Stocks (D) are compounded on a rubber roll mill in accordance with the following recipe:

| Component | Parts by weight |
|---|---|
| Copolymer EPH | 100 |
| High abrasion furnace carbon black | 80 |
| ZnO | 5 |
| Additive (See Table I). | |
| Zinc benzothiazyl sulfide | 1.2 |
| Zinc dibenzyl dithiocarbamate | 2.5 |

The D stocks are then placed in a mold preheated to 100° C. and cured therein at 160° C. for 30 minutes.

For purpose of comparison, six stocks (D′), having a naphthenic petroleum oil in place of the phenolic tackifier but otherwise the same as the D stocks, are compounded and cured as before.

The Wallace plasticity data in Table I show that the phenolic additive is comparable to the naphthenic petroleum oil as a plasticizer. Vulcanizate properties of the stocks are substantially the same whether the phenolic additive or the naphthenic petroleum oil is used. A decrease in $M_{100}$, $M_{300}$ and Shore A hardness and an increase in Yerzley resilience with increasing concentrations of phenolic additive are further indications of the good plasticizing action of the phenolic compounds of this invention.

TABLE I

| | Wallace plasticity | |
|---|---|---|
| | D | D′ |
| Amount of additive [1] phr.: | | |
| 20 | 75 | 81 |
| 30 | 60 | 68 |
| 40 | 44 | 49 |
| 48 | 37 | 47 |
| 68 | 24 | 30 |

[1] Additive is a poly(isobutyl) phenol isomer mixture in the D stocks and naphthenic petroleum oil in the D′ stocks. The isomer mixture comprises essentially the compound of Formula B and has a molecular weight of 450.

EXAMPLE 2

A square woven nylon fabric is fixed against one side of uncured Stocks D and D′ of Example 1 containing 40 parts tackifier by placing each stock in a mold lined with the fabric, placing "Mylar" polyester film over the exposed upper surface of each stock, positioning a metal plate above the film, and applying pressure. The specimens are then removed from the mold and test strips (1″ x 0.5″ x 0.027″) are stamped from them. After the polyester film has been removed, the test strips are aged at ambient room temperature while open to the atmosphere.

Building tack measurements are made at the end of two and five days aging. A method which is designed to simulate the conditions encountered in automatic tire building equipment is employed. The tack specimens are 1″ x ½″ strips of fabric-backed stock (described above). One strip is mounted vertically on the vertical face of a fixed metal block. Another strip is mounted horizontally across a similar block which can be driven into contact with the first block by an air cylinder, the resulting contact area being 0.25 square inch. The force of contact is determined from the pressure applied to the air cylinder. Time of contact is determined by a timing mechanism which can be set for an interval of 0.8 second to 15 seconds. Contact is broken by removing the air cylinder with air at 40 p.s.i., the break time being about 40 milliseconds. Tack is determined as the instantaneous breaking force (measured by a load cell transducer and a high speed recorder). Contact time and breaking force are recorded. Each test strip was subjected to four contacts.

The conditions of testing and the data obtained are given in the attached Table II.

BUILDING TACK.—TABLE II

| | Aging (days) | | | | | | | |
|---|---|---|---|---|---|---|---|---|
| | 2 | | 2 | | 2 | | 2 | |
| | Breaking force (p.s.i.) | | | | | | | |
| | 80 | | 160 | | 80 | | 160 | |
| Contact time (seconds) | 1 | 10 | 1 | 10 | 1 | 10 | 1 | 10 |
| Stock D (Tack, p.s.i.) | 47.2 | 93.6 | 53.6 | 124.0 | 42.0 | 75.2 | 43.6 | 112.0 |
| Stock D′ (Tack p.s.i.) | 35.2 | 42.4 | 35.6 | 52.8 | 30.4 | 35.2 | 24.0 | 40.0 |

I claim:

1. A composition consisting essentially of a uniform mixture of a sulfur curable EPDM polymer and at least 10 parts by weight per hundred parts of polymer of a tackifier of the formula Ar—X where Ar is a substituted phenyl, naphthyl, or a corresponding saturated cyclic hydrocarbon group where Ar has at least one hydrocarbon substituent, which substituents contain a total of at least ten carbon atoms, and where X is a hydroxyl, ether or ester group containing less than about eight carbon atoms.

2. The composition of claim 1 in which the Ar is an aromatic group.

3. The composition of claim 1 in which the tackifier is an alkyl hydroxy benzene.

4. The composition of claim 3 in which the polymer is an ethylene/propylene/1,4-hexadiene polymer.

5. The composition of claim 2 in which the polymer contains 50–75% ethylene units and 2–5% 1,4-hexadiene units and the tackifier is an alkyl phenol.

6. The composition of claim 3 in which the tackifier is a mono alkyl phenol in which the alkyl group contains 17–40 carbon atoms.

7. The composition of claim 2 in which the tackifier is a dialkylphenol in which the alkyl group contains 17–40 carbon atoms.

8. The composition of claim 5 in which the tackifier is dinonyl phenol.

9. The composition of claim 5 in which the tackifier comprises essentially the compound

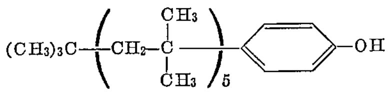

References Cited

UNITED STATES PATENTS

| | | | |
|---|---|---|---|
| 3,354,107 | 11/1967 | Hamed | 260—31.2 |
| 3,378,508 | 4/1968 | Hamed | 260—5 |
| 3,402,140 | 9/1968 | Bickel | 260—38 |

FOREIGN PATENTS 933,952 4/1961 Great Britain.

OTHER REFERENCES

Chemical Abstracts, vol. 59, October 1963, 8951, *d*+*e*—Latex with functional groups in polymers and their adhesive properties.

JOSEPH L. SCHOFER, Primary Examiner

R. S. BENJAMIN, Assistant Examiner

U.S. Cl. X.R.

260—33.2, 33.4, 619

PO-1050
(5/69)

UNITED STATES PATENT OFFICE
CERTIFICATE OF CORRECTION

Patent No. 3,531,430 Dated September 29, 1970

Inventor(s) EDWIN ROBERT EVANS

It is certified that error appears in the above-identified patent and that said Letters Patent are hereby corrected as shown below:

Column 1, immediately after the name and address of the inventor, there should appear the following:

"assignor to E. I. du Pont de Nemours and Company, Wilmington, Delaware, a corporation of Delaware".

SIGNED AND
SEALED
JAN 19 1971

(SEAL)
Attest:

Edward M. Fletcher, Jr.
Attesting Officer

WILLIAM E. SCHUYLER, JR.
Commissioner of Patents